United States Patent [19]

Relvini et al.

[11] Patent Number: 5,733,992
[45] Date of Patent: Mar. 31, 1998

[54] PROCESS FOR PREPARING ACRYLIC POLYMERS WITH ACRYLAMIDO METHYLPROPAN-SULPHONIC ACID DISPERSANTS

[75] Inventors: Pasquale Relvini; Fabio Giberti, both of Milan, Italy

[73] Assignee: Elf Atochem Italia S.r.l., Italy

[21] Appl. No.: 740,073

[22] Filed: Oct. 24, 1996

Related U.S. Application Data

[63] Continuation of Ser. No. 443,019, May 17, 1995, abandoned.

[30] Foreign Application Priority Data

May 19, 1994 [IT] Italy ................... MI94A1013

[51] Int. Cl.[6] ........................................ C08F 2/20
[52] U.S. Cl. .................... 526/201; 526/70; 526/287
[58] Field of Search ........................... 526/70, 201, 287

[56] References Cited

U.S. PATENT DOCUMENTS

| | | | |
|---|---|---|---|
| 2,072,904 | 3/1937 | Ries | 526/70 |
| 3,129,207 | 4/1964 | James | 526/70 |
| 4,340,702 | 7/1982 | Huddleston, Jr. | 526/70 |
| 4,469,839 | 9/1984 | Maruhashi | 526/201 |
| 5,344,901 | 9/1994 | Relvini | 526/201 |

FOREIGN PATENT DOCUMENTS

0457356A2  11/1991  European Pat. Off. .

*Primary Examiner*—Christopher Henderson
*Attorney, Agent, or Firm*—Finnegan, Henderson, Farabow, Garrett, and Dunner, L.L.P.

[57] ABSTRACT

Process for the polymerization in aqueous suspension of acrylic monomers in the presence of a polymeric suspending agent, homopolymer or copolymer of a compound of formula:

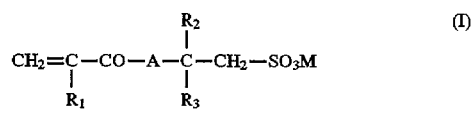

wherein: $R_1$ is H or $CH_3$; $R_2$ and $R_3$, equal or different, are H or alkyls $C_1-C_8$, optionally branched when possible; M is an alkaline or alkaline-earth metal or ammonium and A is NH, O or $NCH_3$, characterized in that the polymerization aqueous phase is wholly or partly formed by the mother waters obtained after the separation of the acrylic polymer, so as to have a polymerizable suspension containing at least 0,01% by weight and up to about 1% of said suspending agent and at least from 0.05% to 5% by weight of the other products above mentioned obtained during the polymerization.

4 Claims, No Drawings

PROCESS FOR PREPARING ACRYLIC POLYMERS WITH ACRYLAMIDO METHYLPROPAN-SULPHONIC ACID DISPERSANTS

This is a continuation of application Ser. No. 08/443,019, filed May 17, 1995, now abandoned.

BACKGROUND OF THE INVENTION

The present invention relates to the manufacture of beads of acrylic (co)polymers, in particular of beads suitable for the applications as coating.

It is well known that for certain coatings, for instance in certain dental applications, beads having a granulometry from 0.03 to 0.100 mm are required.

In particular the present invention relates to the manufacture of beads of acrylic (co)polymers, obtained by processes in aqueous suspension in the presence of suspending agents, utilizable as coating.

It is known that with the processes of polymerization in suspension, beads of polymers having an average diameter between 0.1–1 mm are obtained.

The granulometric size distribution is very large and generally one proceeds to separation by screening if a certain kind of average size is desired. However the drawback from the industrial point of view is that for particles for coating with the indicated sizes, the screening is not very effective and is complex and besides there is the further drawback that the yields are very low.

It is not therefore assumable from the industrial point of view a production by using these processes known in the art.

The polymerization in suspension is a reaction type which is performed in a system in which the monomer is suspended in the form of small drops in a continuous phase and polymerized using an initiator of radical type soluble in the monomer. The continuous phase is generally water.

The ratio between continuous phase (water) and discontinuous phase (monomer) is generally comprised between 1:1 and 3:1.

In the practical embodiment of this type of process it is necessary the employment of suspending stabilizers hindering the coalescence of the small drops of monomer in the most advanced steps of the polymerization.

As suspending stabilizers are used, in the most usual technique, hydrosoluble macromolecular compounds with affinity towards the monomer which, placing themselves at the interface between organic phase and aqueous phase, form a protective film hindering agglomeration of the particles.

At the end of the polymerization the suspending agent is removed from the surface of the polymer particles by washing with water.

The suspending agent is a key factor as its characteristics conditions the performances of the whole process both from the point of view of the quality of the final product and from the point of view of costs.

Polymerization processes in aqueous suspension of acrylic monomers are also known, in particular the one described in European patent application 457,356 which corresponds with U.S. Pat. No. 5,344,901, which is herein fully incorporated by reference, wherein particular polymers selected from the homopolymers of compounds of formula

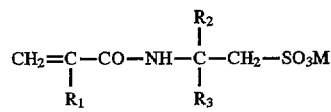

are used as suspending and stabilizing agent of the aqueous suspension, wherein: $R_1$=H, $CH_3$; $R_2$ and $R_3$, equal or different, are H, alkyls $C_1$–$C_8$, and M=an alkaline or alkaline-earth metal, or copolymers of said compounds with acrylic monomers.

By using said suspending agents various advantages are obtained, such as:

high stability of the aqueous suspension, also operating with ratios water/acrylic monomers near unity waste waters having a very low content in residual polymer obtainment of acrylic polymers having high optical purity.

However, according to the examples of EP Patent 457,356 the obtained beads have average sizes from 0.2 to 0.3 mm. It is known that in the industrial plants, which are large-sized, there exist some bonds to the stirring, wherefore it is not industrially suggestable to act on this parameter to obtain fine particles for coating.

It was felt the need to have at one's disposal an industrial process with high yields making available beads of average sizes from 0.03 to 0.100 mm to be used as coating and at the same time capable of utilizing the advantages indicated for the suspending agent cited above.

It has now been unexpectedly and surprisingly found that this is possible using the process described hereunder.

SUMMARY OF THE INVENTION

The object of the present invention is therefore a process for the polymerization in aqueous suspension of acrylic monomers in the presence of a radical initiator soluble in the monomer and of a polymeric suspending agent selected from:

a) the homopolymers of a compound of formula:

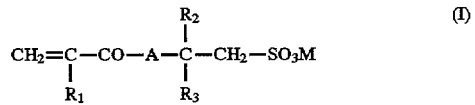

wherein: $R_1$ is H or $CH_3$; $R_2$ and $R_3$, equal or different, are H or alkyls $C_1$–$C_8$, optionally branched when possible; M is an alkaline or alkaline-earth metal or ammonium and A is NH, O or $NCH_3$, b) the copolymers of said compound of formula I with 40% by weight at most of acrylic monomers, characterized in that the polymerization aqueous phase is wholly or partly formed by the mother waters obtained after the separation of the acrylic polymer, said mother waters containing an organic phase which comprises said suspending agent and other products obtained during the polymerization, optionally charged with a further amount of said suspending agent, so as to have a polymerizable suspension containing at least 0.01% by weight and up to about 1% by weight of said suspending agent and at least higher than 1.5% by weight and up to about 5% by weight of the other products mentioned above, obtained during the polymerization. Preferably 0.03–0.3% by weight of suspending agent and 2–3% by weight of the other products obtained during the polymerization.

The suspending agents of formula (I) are prepared by means of the methods indicated in EP 457,356, also when A=O the same methods can be utilized. The acrylic polymer separates from the mother waters, for instance by centrifugation or filtering.

The process according to the invention can be carried out with the known modalities for polymerizations in aqueous suspension, i.e. operating with ratios between the aqueous phase and the acrylic monomers generally comprised between 1:1 and 3:1, in the presence of suspending agents and of a radical polymerization initiator at temperatures at which the decomposition of the initiators occurs, generally comprised from 50° C. to 120° C., as more specifically described in EP patent application 457,356.

The aqueous phase is formed wholly (100%) or partly, even of the order of 30–50% by weight, by the mother waters obtained by a previous polymerization, provided that the above indicated limits are respected.

Such mother waters obtained from the separation of the acrylic polymer at the end of the polymerization, generally contain, with respect to the initial ratio aqueous phase/monomers and under the reaction conditions used, from 1.5% to 5% by weight of an organic phase, determined as dry residue at 160° C., formed by the suspending agent and by "other products" (e.g., the polymer contained in the mother liquors in the form of particles in emulsion) obtained during the polymerization.

The suspending agent comes almost entirely from that initially introduced.

By wholly or partly recycling said mother waters, aqueous suspension of acrylic monomers are then obtained, which contain besides the suspending agent previously used also the above mentioned "other products" obtained during the polymerization and which result more stable.

The amount to be recycled must be at least such that, in relation to the dry content at 160° C. of said mother waters, aqueous emulsions of acrylic monomers are obtained, containing at least the amounts by weight indicated above of said suspending agents, and at least the amounts by weight indicated above of said "other products" obtained during the polymerization.

It is possible to recycle from 30 to 100% by weight of said mother waters, in case with further amounts of water optionally containing fresh suspending agent.

The acrylic monomers which can be polymerized according to the process of the present invention are formed by $C_1$–$C_8$ alkylacrylates or methacrylates such as, for instance, methyl(meth)acrylate, ethyl(meth)acrylate, propyl(meth)acrylate, isopropyl(meth)acrylate, butylacrylate, sec-butylmethacrylate, terbutylmethacrylate.

They can be used alone or in admixture with each other, optionally in the presence of another monomer, in amounts of 50% by weight at most, containing double bonds such as, for instance, styrene, alpha-methylstyrene, acrylonitrile, (meth)acrylonitrile, n-alkyl- or aryl-maleimides, butadiene, or (meth)acrylic acid.

As radical initiators, peroxides, such as for instance, t-butylperoxy-2-ethylhexanoate, dibenzoylperoxide, t-butylperoxydiethylacetate or unstable azocompounds such as, for instance, azodiisobutyronitrile, can be employed.

The stabilizing agents (a) and (b) used in the process of the present invention, are prepared by homopolymerization of the compounds of formula (I) or by copolymerization of said compounds of formula (I) with acrylic monomers in aqueous solution, in the presence of radical initiators, according to what described in EP patent application 457,356. In particular the compounds of formula (I) can be, for instance, 2-acrylamido-2-methylpropansulphonate of sodium, 2-methacrylamido-2-methylpropansulphonate of sodium, 2-acrylamido-propansulphonate of sodium, 2-acrylamido-2-ethansulphohate of sodium.

Compounds of formula I wherein $R_2$ and $R_3$ are alkyl $C_1$–$C_8$, also branched when possible, are preferred.

Acrylic monomers which can be copolymerized with the compounds of formula (I) can be, for instance,(meth)acrylamide, alkaline or alkaline-earth salts of the (meth)acrylic acid, esters of the (meth)acrylic acid with an aliphatic alcohol $C_1$–$C_4$, acrylonitrile.

DESCRIPTION OF THE INVENTION

With the process of the present invention it is therefore possible to industrially prepare considerable amounts of beads with said sizes of acrylic polymers for coating having the following advantages, and in particular drastic reduction of the amount of mother waters to be removed drastic reduction of the specific consumption of suspending agent without, however, modifying the good mechanical and optical properties of the polymers so obtained.

The Applicant has therefore found an industrial process which allows to obtain contemporaneously the fine particles indicated above to be used as coating, but at the same time also a process in the same plant, without appreciable modifications and which allows to obtain also particles for thermoplastic uses. This allows to avoid an industrial plant intended only for fine particles.

Further object of the invention is that it is possible to utilize the recycle with the advantages indicated above also to prepare beads for thermoplastic applications, having average sizes from about 0.2 to about 0.3 mm.

In this case the conditions to be utilized—it has been unexpectedly found—are different and the process is precisely the following.

Further object of the present invention is therefore a process for the polymerization in aqueous suspension of acrylic monomers in the presence of a radical initiator soluble in the monomer and of a polymeric suspending agent selected from:

a) homopolymers of a compound of formula:

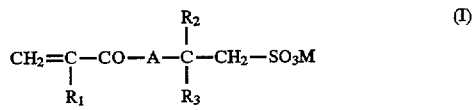

$$CH_2=\underset{R_1}{\overset{R_2}{C}}-CO-A-\underset{R_3}{\overset{}{C}}-CH_2-SO_3M \quad (I)$$

wherein: $R_1$ is H or $CH_3$; $R_2$ and $R_3$, equal or different, are H or alkyls $C_1$–$C_8$, optionally branched when possible; M is an alkaline or alkaline-earth metal or ammonium and A is NH, O or NCH$_3$, b) the copolymers of said compound of formula I with 40% by weight at most of acrylic monomers, characterized in that the polymerization aqueous phase is wholly or partly formed by the mother waters obtained after the separation of the acrylic polymer, said mother waters containing an organic phase which comprises said suspending agent and other products obtained during the polymerization, optionally charged with a further amount of said suspending agent, so as to have a polymerizable suspension containing at least 0.01% by weight and up to about 1% of said suspending agent and at least 0.05% and lower than 1.5% by weight of the other products mentioned above obtained during the polymerization. The suspending agent is preferably in amounts from 0.03 to 0.3%.

The aqueous phase and this is the characterizing part of the present invention, is wholly or partly formed by the mother waters obtained from a previous polymerization.

Such mother waters obtained by the separation of the acrylic polymer at the end of the reaction, generally contain, in relation to the initial ratio aqueous phase/monomers and to the reaction conditions employed, from 0.5 to 1.5% by weight of an organic phase, determined as dry residue at 160° C., formed by the suspending agent and by "other products" obtained during the polymerization.

The suspending agent comes almost entirely from that initially introduced.

By wholly or partly recycling said mother waters, aqueous suspensions of acrylic monomers are therefore obtained, which contain, besides the suspending agent previously used, also the above said ,"other products" obtained during the polymerization that result more stable.

The amount to be recycled must be at least such that, in relation to the dry content at 160° C. of said mother waters, aqueous emulsions of acrylic monomers containing the indicated minimum amounts of suspending agents and of said "other products" obtained during the polymerization, are obtained.

It is possible to recycle from 30 to 100% by weight of said mother waters, in case integrating with further amounts of water optionally containing fresh suspending agent.

It has now been surprisingly found that using the same reaction kinetics, of about 2 hours, one can operate with the invention processes also at concentrations of monomer near 1, i.e. the ratio water and monomer is about 1:1, without phenomena of agglomeration or instability of the suspension occurring.

In the art one can operate at ratios 1:1, but this by utilizing slower kinetics.

With the process of the invention also higher productivities are therefore obtained.

Therefore the global process of the invention, independently from the particle sizes, is a process for the polymerization in aqueous suspension of acrylic monomers in the presence of a radical initiator soluble in the monomer and of a polymeric suspending agent selected from:

a) homopolymers of a compound of formula:

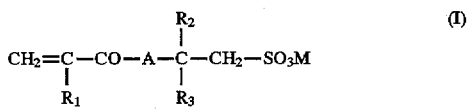

(I)

wherein: $R_1$ is H or $CH_3$; $R_2$ and $R_3$, equal or different, are H or alkyls $C_1$–$C_8$, optionally branched when possible; M is an alkaline or alkaline-earth metal or ammonium and A is NH, O or $NCH_3$, b) the copolymers of said compound of formula I with 40% by weight at most of acrylic monomers, characterized in that the polymerization aqueous phase is wholly or partly formed by the mother waters obtained after the separation of the acrylic polymer, said mother waters containing an organic phase which comprises said suspending agent and other products obtained during the polymerization, optionally charged with a further amount of said suspending agent, so as to have a polymerizable suspension containing at least 0.01% by weight and up to about 1% of said suspending agent and at least from 0.05% to 5% by weight of the other products mentioned above obtained during the polymerization.

The fine beads for coating and the beads of larger sizes for thermoplastic applications are obtained operating as indicated above.

Illustrative examples of the invention are given but without limiting the same.

EXAMPLE 1

Preparation of the Suspending Agent 120 parts of a 40% weight NaOH solution and 630 parts of deionized water are loaded in a reactor. 250 parts of 2-acrylamido-2-methylpropansulphonic acid (AMPS) are slowly fed, then the pH is adjusted in the range 7–8 with small amounts of soda or of AMPS. After the solution has been fluxed with nitrogen to eliminate oxygen and heated at 50° C., the potassium persulphate 0.075 parts and the sodium methabisulphite 0.025 parts are added. Polymerization ends in about 60 minutes. Then it is diluted with 4000 parts of deionized water obtaining a solution with a dry residue at 160° C. of 5.5% by weight and a Brookfield viscosity of 4 Pa·s, measureed at 25° C.

Examples from 2 to 9 for preparing beads from 0.2 to about 0.3 mm by extrusion.

EXAMPLE 2

Polymerization is carried out in suspension of the methylmethacrylate and of the ethyl acrylate using as suspending agent the homopolymer of the sodic salt of 2-acrylamido-2-methylpropansulphonic obtained in Example 1.

193 parts of deionized water and 7 parts of the solution obtained in Example 1, corresponding to 0.385 parts of dry product are loaded in a stirred, coated and pressure-resisting reactor. Oxygen is eliminated by means of nitrogen flow and the solution is heated at 80° C. 100 parts of a mixture, it being deoxigenated too, formed by: methylmethacrylate 96 parts, ethylacrylate 4 parts, t-butylperoxy-2-ethylhexanoate 0.25 parts, n-butanthiol 0.12 parts, are then fed.

The reactor is hermetically sealed, pressurized at 100 KPa and under continuous stirring the mixture is gradually heated up to 110° C. in 120'. The reactor is let stand at 110° C. for 15 minutes, then cooled.

The polymer, under the form of beads, is separated from the mother waters by centrifugation, washed with deionized water and dried in stove at 80° C.

The beads size is reported in Table 2.

The mother waters, with a dry residue at 160° C. of about 0.62% by weight, partly formed by the suspending agent (0.2% by weight) and for the remaining fraction by other products obtained during the polymerization, are gathered to be utilized in the subsequent polymerization tests.

EXAMPLE 3

In the same reactor already utilized in example 2 and with the general operating modalities described in said example, it is carried out the polymerization by suspension of methylmethacrylate and of ethylacrylate, using as suspending solution a fraction of the mother waters coming from the polymerization described in example 2, diluted with an identical amount of deionized water and without further addition of suspending agent.

100 parts of deionized water and 100 parts of mother waters of example 2 are threfore loaded in the reactor, obtaining a 0.31% weight solution of dry residue.

The solution is heated to 80° C. and 100 parts of a mixture, formed by methylmethacrylate 96 parts, acrylate of ethyl 4 parts, t-butylperoxy-2-ethylhexanoate 0.25 parts, n-butanthiol 0.12 parts are then fed.

Polymerization is carried out according to the modalities already described in example 2.

The polymer, under the form of beads is separated from the mother waters by centrifugation, washed with deionized water and dried in stove at 80° C.

The mother waters, with a dry residue of 0.8% by weight, partly formed by the suspending agent (0.1% by weight) and for the remaining fraction by other products obtained during the polymerization, are gathered to be reutilized.

EXAMPLES 4-9

In the same reactor already utilized in example 3, six sequential polymerizations of the methylmethacrylate and of the ethylacrylate are carried out, utilizing as aqueous phase a mixture formed for 50% by mother waters coming from the previous test and for 50% by a 0.1% weight solution of fresh suspending agent.

100 parts of mother water coming from example 3, 99 parts of deionized water and 1 part of the solution obtained in example 1, are then loaded in the reactor, obtaining a 0.41% weight solution of dry residue.

100 parts of a mixture, formed by methylmethacrylate 96 parts, ethylacrylate 4 parts, t-butyl-peroxy-2-ethylhexanoate 0.25 parts, n-butanthiol 0.12 parts are fed.

One proceeds then with the same modalities described in example 2.

The subsequent examples from 5 to 9 are carried out with the same operating modalities of the previous example 4, in the same polymerization reactor and using in each test 50% of the water mothers coming from the immediately preceding test.

In Table 1 are reported the analysis of the mother waters, obtained in each examples from 2 to 9, in terms of % by weight of suspending agent, C.O.D. (Chemical Oxygen Demand) and of dry residue at 160° C.

From said analysis no appreciable bunchings of "other products" obtained during the polymerization are noticed.

TABLE 1

ANALYSIS OF THE MOTHER WATERS

| EXAMPLE | SUSPENDING AGENT | | | COD (1) ppm | DRY RESIDUE (2) % by weight |
|---|---|---|---|---|---|
| | FRESH % by weight | RECYCLED % by weight | TOTAL % by weight | | |
| 2 | 100 | 0 | 0.20 | 2840 | 0.62 |
| 3 | 0 | 50 | 0.10 | 2230 | 0.80 |
| 4 | 50 | 50 | 0.10 | 2620 | 0.64 |
| 5 | 50 | 50 | 0.10 | 2195 | 0.53 |
| 6 | 50 | 50 | 0.10 | 2645 | 0.65 |
| 7 | 50 | 50 | 0.10 | 2420 | 0.66 |
| 8 | 50 | 50 | 0.10 | 2325 | 0.62 |
| 9 | 50 | 50 | 0.10 | 1640 | 0.75 |

(1) IRSA Metodo "Chemical Oxygen Demand"
(2) Dry Residue at 160° C.

In Table 2 are reported the characteristics of the polymer beads obtained in the examples from 2 to 9, in terms of intrinsic viscosity, content in residual monomers, percent by weight of polymeric agglomerates with sizes higher than 1 mm and average granulometry of the beads.

From said table meaningful changes of the characteristics of the polymer beads, by the progress of the recycles, are not noticed.

TABLE 2

| EXAMPLE | INTRINSIC VISCOSITY (1) ml/g | MONOMERS M.M.A. (2) ppm | RESIDUAL A.E. (3) ppm | AGGLOMERATES >1 mm % by weight | BEADS AVERAGE GRANULOMETRY mm |
|---|---|---|---|---|---|
| 2 | 63.2 | 1460 | <100 | 2.15 | 0.275 |
| 3 | 59.3 | 2260 | 100 | 2.18 | 0.250 |
| 4 | 59.5 | 3000 | 220 | 0.88 | 0.210 |
| 5 | 59.1 | 1790 | <100 | 1.19 | 0.215 |
| 6 | 60.1 | 2350 | <100 | 1.29 | 0.230 |
| 7 | 58.8 | 1570 | <100 | 1.90 | 0.210 |
| 8 | 64.7 | 1890 | <100 | 1.81 | 0.210 |
| 9 | 62.2 | 1660 | <100 | 1.55 | 0.210 |

(1) ISO Method 1628-116
(2) Methylmethacrylate
(3) Ethylacrylate

The thermoplastic and optical characteristics of the polymers of examples 2-9 are reported in Table 2A.

They result to be the typical characteristics of an extruded PMMA of good quality. In particular appreciable changes of the characteristics, by progress of the recycles, are not noticed. The polymer beads, extruded under the form of flat plate, allow to obtain manufactured articles with very good aesthetic properties and without surface defects.

TABLE 2A

| EXAMPLES | 2 | 3 | 4 | 5 | 6 | 7 | 8 | 9 |
|---|---|---|---|---|---|---|---|---|
| Softening temperature Vicat 49N, ISO 306 method | 110° C. | 110° C. | 111° C. | 109° C. | 110° C. | 109° C. | 110° C. | 109° C. |
| Melt Flow Index 230° C./3.8 Kg, ISO 1133 method | 1,2 g/10' | 1,2 g/10' | 1,3 g/10' | 1,2 g/10' | 1,2 g/10' | 1,2 g/10' | 1,2 g/10' | 1,2 g/10' |
| Transmission of light (400–900 nm) tests thickness 3 mm, ASTM D 1003-61 method | 92% | 92% | 92% | 92% | 92% | 92% | 92% | 92% |
| Haze tests thickness 3 mm, ASTM D 1003-61 method | 0.50% | 0.50% | 0.50% | 0.50% | 0.49% | 0.50% | 0.50% | 0.50% |
| Yellow Index tests thickness 80 mm, ASTM D1925-70 method | 2,5 | 2,4 | 2,5 | 2,6 | 2,5 | 2,2 | 2,8 | 2,5 |

Examples from 10 to 15 for preparing beads to be utilized as coating having sizes from 0.03 to 0.100 mm.

EXAMPLES 10–15

In the same reactor already utilized in example 3, six sequential polymerizations of the methylmethacrylate are carried out, utilizing as aqueous phase the mother waters coming from the previous test.

200 parts of mother waters coming from example 3 are then loaded in the reactor, obtaining a 0.80% weight solution of dry residue.

A mixture of 100 parts of methylmethacrylate, 0.2 parts of t-butyl-peroxy-2-ethylhexanoate, 0.05 parts of n-butanthiol is fed.

One proceeds with the same modalities described in example 2.

The subsequent examples from 11 to 15 are carried out with the same operating modalities of the previous example 10, in the same polymerization reactor and using in each test the water mothers coming from the immediately preceding test.

In Table 3 are reported the analysis of the mother waters, obtained in each examples from 10 to 15, in terms of % by weight of suspending agent, C.O.D. (Chemical Oxygen Demand) and of dry residue at 160° C.

From said analysis no appreciable accumulation of "other products" obtained during the polymerization are noticed. The characteristics of the beads are reported in Table 4.

From said table it can be noticed that the average diameter of the beads quickly decreases and reaches after 3 recycles the 50–60 micron which are the preferred sizes required by the application fields, such as that of the surface coating, ink, dental resins.

The other properties of the beads do not appreciably vary by the progress of the recycles.

Example 10 shows that the desired sizes are not yet obtained.

TABLE 3

ANALYSIS OF THE MOTHER WATERS

| EXAMPLE | SUSPENDING AGENT | | | COD ppm | DRY RESIDUE (1) % by weight |
|---|---|---|---|---|---|
| | FRESH % by weight | RECYCLED % by weight | TOTAL % by weight | | |
| 11 | 0 | 100 | 0.10 | 2018 | 2.5 |
| 12 | 0 | 100 | 0.10 | 2202 | 2.4 |
| 13 | 0 | 100 | 0.10 | 2027 | 2.3 |
| 14 | 0 | 100 | 0.10 | 2298 | 2.3 |
| 15 | 0 | 100 | 0.10 | 2179 | 2.1 |

(1) Dry Residue at 160° C.

TABLE 4

| | | EXAMPLES | | | | | |
|---|---|---|---|---|---|---|---|
| | | 10 | 11 | 12 | 13 | 14 | 15 |
| Glass transition temperature (1) | °C. | 89 | 90 | 89 | 91 | 90 | 90 |
| Molecular weight MW (2) | | 700000 | 720000 | 700000 | 690000 | 700000 | 710000 |
| Intrinsic viscosity (3) | ml/g | 175 | 180 | 173 | 165 | 170 | 180 |

TABLE 4-continued

| | | EXAMPLES | | | | | |
|---|---|---|---|---|---|---|---|
| | | 10 | 11 | 12 | 13 | 14 | 15 |
| Dynamic viscosity in MEK at 23° C. (15% solid) (4) | mPas (cP) | 1050 | 1020 | 950 | 950 | 990 | 1050 |
| Average diameter | μm | 180 | 90 | 50 | 45 | 50 | 48 |

Notes:
(1) Mettler DSC-30 calorimeter, heating rate 20° C./min
(2) GPC apparatus with 4 ultrastyragel columns ($10^3$-$10^4$-$10^5$-$10^6$); solvent: $CHCl_3$ (elution rate) 1 ml/min, 1R detector
(3) Bishoff-Desreux Viscosimeter
(4) Contraverses Rheomat 115 viscosimeter equipped with system of measurements MS-DIN, Shear Rate 500/sec.

We claim:

1. Process for making polymer beads having a granulometry from 0.03 to 0.09 mm in a stable aqueous suspension of acrylic monomers in the presence of a radical initiator soluble in the monomer and of a polymeric suspending agent selected from: a) the homopolymers of a compound of formula:

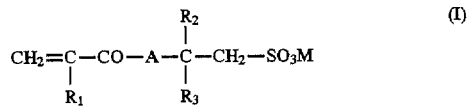

$$CH_2=\underset{R_1}{\overset{R_2}{\underset{|}{C}}}-CO-A-\underset{R_3}{\overset{|}{\underset{|}{C}}}-CH_2-SO_3M \quad (I)$$

wherein: $R_1$ is H or $CH_3$; $R_2$ and $R_3$, equal or different, are H or $C_1$–$C_8$ alkyl, optionally branched when possible; M is an alkaline or alkaline-earth metal or ammonium and A is NH, O, or $NCH_3$, and b) the copolymers of said compound of formula I comprising 40% by weight at most of acrylic monomers, characterized in that the polymerization aqueous phase is wholly or partly formed by the mother waters obtained after the separation of the acrylic polymer, said mother waters containing an organic phase comprising said suspending agent and other products obtained during the polymerization, with a further amount of said suspending agent optionally added to said aqueous phase, so as to have a polymerizable suspension containing in relation to the dry content of said mother waters at 160° C. at least 0.01% by weight and up to about 1% of said suspending agent and at least from 1.5% to 5% by weight of said other products obtained during the polymerization.

2. Process according to claim 1 wherein the amount of the other products mentioned above obtained during the polymerization is comprised between 2–3% by weight.

3. Process according to claim 1 wherein the amount of suspending agent is comprised between 0.03 and 0.3% by weight.

4. Process according to claim 1 wherein the suspending agent is selected from 2-acrylamido-2-methylpropansulphonate of sodium, 2-methacrylamido-2-methylpropansulphonate of sodium, 2-acrylamidopropansulphonate of sodium.

* * * * *